United States Patent
Chen et al.

(10) Patent No.: US 9,014,523 B2
(45) Date of Patent: Apr. 21, 2015

(54) LARGE MODE FIELD ACTIVE OPTICAL FIBER AND MANUFACTURE METHOD THEREOF

(75) Inventors: Wei Chen, Hubei (CN); Shiyu Li, Hubei (CN); Daoyu Lei, Hubei (CN); Dongxiang Wang, Hubei (CN); Wenyong Luo, Hubei (CN); Wenjun Huang, Hubei (CN); Fuming Hu, Hubei (CN); Peng Hu, Hubei (CN)

(73) Assignee: Fiberhome Telecommunications Technologies Co., Ltd., Hubei (CN)

( * ) Notice: Subject to any disclaimer, the term of this patent is extended or adjusted under 35 U.S.C. 154(b) by 501 days.

(21) Appl. No.: 13/497,314

(22) PCT Filed: Nov. 24, 2010

(86) PCT No.: PCT/CN2010/079051
§ 371 (c)(1),
(2), (4) Date: Mar. 21, 2012

(87) PCT Pub. No.: WO2011/085619
PCT Pub. Date: Jul. 21, 2011

(65) Prior Publication Data
US 2012/0263428 A1  Oct. 18, 2012

(30) Foreign Application Priority Data
Jan. 18, 2010 (CN) .......................... 2010 1 0000810

(51) Int. Cl.
G02B 6/028 (2006.01)
G02B 6/036 (2006.01)
C03B 37/012 (2006.01)
C03B 37/018 (2006.01)
C03B 37/027 (2006.01)

(52) U.S. Cl.
CPC ............ *G02B 6/0365* (2013.01); *G02B 6/0281* (2013.01); *C03B 37/01228* (2013.01); *C03B 37/0183* (2013.01); *C03B 37/02754* (2013.01); *C03B 2201/12* (2013.01); *C03B 2201/31* (2013.01); *C03B 2201/34* (2013.01); *C03B 2203/12* (2013.01)

(58) Field of Classification Search
None
See application file for complete search history.

(56) References Cited

U.S. PATENT DOCUMENTS

| | | | |
|---|---|---|---|
| 7,170,909 B2 * | 1/2007 | Budni et al. | 372/6 |
| 7,634,164 B2 * | 12/2009 | Farroni et al. | 385/127 |
| 2003/0031444 A1 * | 2/2003 | Croteau et al. | 385/127 |
| 2006/0029344 A1 * | 2/2006 | Farroni et al. | 385/123 |
| 2007/0104436 A1 * | 5/2007 | Li et al. | 385/125 |

* cited by examiner

*Primary Examiner* — Michelle R Connelly
(74) *Attorney, Agent, or Firm* — Muncy, Geissler, Olds & Lowe, P.C.

(57) ABSTRACT

A large mode field active optical fiber and manufacture method thereof is provided. The large mode field active optical fiber is formed by drawing a fiber core (1), a quartz glass internal cladding (2), a quartz glass outer cladding (3), and a coating (4). The quartz glass internal cladding (2), the quartz glass outer cladding (3), and the coating (4) are sequentially coated on the outer surface of the fiber core (1). The fiber core (1) is formed by depositing, melting, and shrinking the tetrachlorosilane doped with rare earth ions in a quartz glass tube. The refractive index of the fiber core (1) is a graded refractive index, and the section parameter a thereof is $1 \leq \alpha \leq 3$. The appearance of the quartz glass inner cladding (2) is regular multi-prism shaped. The large mode field active optical fiber provides an approximate single mode output, increases the capacity of bearing the laser power for the active optical fiber, increases the quality of the light beam of the output laser, avoids the problem that there is a hollow ring in the output laser, increases the reliability of the high power fiber laser, increases the utilization efficiency of the raw materials, and reduces the manufacture cost.

10 Claims, 2 Drawing Sheets

LARGE MODE FIELD ACTIVE OPTICAL FIBER AND MANUFACTURE METHOD THEREOF

FIELD OF TECHNOLOGY

This invention involves a kind of optical fiber and its manufacturing method, particularly involves a kind of large mode field active optical fiber and manufacture method thereof.

BACKGROUND TECHNOLOGY

The technical terms involved in this invention are described as follows:

Deposition: the technological process that the raw material of optical fiber sets off chemical reaction and generates doped silica glass in certain environment;

Collapsar: the technological process that the deposited hollow glass tube is gradually burned into solid glass rod under certain heat source;

Bushing: super pure silica glass tube with certain sectional area and dimensional homogeneity;

Parent tube: super pure silica glass tube for deposition;

Refractive index profile (RIP): relation curve between refractive index and radius of optical fiber or optical fiber preform (including optical fiber core rod);

Absolute refractive index difference ($\delta n$): the difference between refractive indexes of pure silica glass and parts of optical fiber preform;

Relative refractive index difference ($\Delta\%$):

$$\Delta\% = \frac{n_i^2 - n_0^2}{2n_i^2} \times 100\%,$$

wherein, $n_1$ is the refractive index of layer i fiber material, and $n_0$ is the refractive index of pure silica glass.

RIP distribution parameter ($\alpha$): $n(r)=n_1[1-2\Delta(r/\alpha)^\alpha]^{0.5}$, wherein, $n(r)$ is refractive index at radius r, a is fiber (or core rod) radius, $n_1$ is the max. refractive index in fiber (or core rod) core space, and $\alpha$ is RIP distribution parameter;

Effective area:

$$A_{eff} = 2\pi \times \frac{\left(\int_0^\infty E^2 r\, dr\right)^2}{\int_0^\infty E^4 r\, dr},$$

wherein, E is transmission-relating electric field, and r is fiber radius;

PCVD: plasma chemical vapor deposition.

Fiber laser is a kind of laser that adopts optical fiber as laser medium to acquire the laser output of corresponding waveband via the different rare earth ion doped in fiber ground substance material. Its applying field has been rapidly spreading from the current most matured fiber communication network to other more extensive laser applying fields, such as processing and treatment of metal and nonmetal materials, laser engraving, laser product marking, laser welding, welding seam cleaning, precision drilling, laser detection and measurement, laser graphic arts imaging, laser radar system, pollution control, sense technology, space technology and laser medicine, etc. For conventional single mode fiber laser, the pump list input in fiber core is also required to be single mode, which limits the pump light input efficiency, and leads to relatively low output power and efficiency of fiber laser. Doubly coated fiber provides an effective technological approach to improve output power and conversion efficiency of fiber laser, and changes the history that fiber laser can only be used as a photonic device with small power. Taking into consideration the factors of conversion efficiency, laser damage threshold and base loss, the rare earth doped silica doubly coated fiber is the optimal choice to realize high-efficiency fiber laser or amplifier.

With the rapid development of semiconductor laser pumping, laser coupling and other energy photoelectronic technologies, the multimode pumping technology has developed from the original end pump technology to current side pump technology, from single pump technology to multi pump set technology, accordingly, the power of fiber laser has also developed from the original milliwatt level to kilowatt level, and even myriawatt level. Ytterbium-doped, erbium-doped, ytterbium and erbium doped, thulium-doped, holmium-doped, neodymium-doped, praseodymium-doped, samarium-doped and other various new type high-power fiber lasers have been widely applied, and the output power of single doubly coated fiber laser has been gradually increasing. Currently, the continuous laser output power of single ytterbium-doped high-power fiber laser in foreign countries has reached 9.6 kW, while that in China is only 1.64 kW; the continuous output laser power of single thulium-doped high-power fiber laser in foreign countries has reached 1000 W, while that in China is only 100 W. These new type fiber lasers have the advantages of beam quality close to diffraction limit, long life (MTTF over 100,000 hours), high efficiency of photoelectric conversion, compact shape, low operating cost, easy maintenance and application, etc.

At present, the high-power fiber laser generally adopts conventional large-mode AOF, with the following technical difficulties, for example: to expand mode diameter is one of the main approaches to improve the loading power of fiber lasers, but the enlarged mode diameter will cause decrease of bean quality, increase of bending loss, and other negative effects; as to the conventional AOF, the mode diameter is enlarged to improve fiber loading power on one hand, the numerical aperture of optical fiber core has to be decreased to assure beam quality, both of which lead to technical difficulty, while cannot significantly improve the mode. In addition, when enlarging the mode diameter, the bending loss is rapidly increasing, which causes optical power leakage and even fiber damage, and finally abnormal operation. Moreover, as to the current large-mode AOF, the external coating adopts organic resin material of low refractive index, with low temperature resistant properties, while the optical fiber surface temperature is over 100° C. when high-power fiber laser is working at high power for long time, therefore, the damaged or carbonized external organic coating material causes AOF failure. These problems, as critical to improving the practical reliability of high-power fiber laser, must be solved as soon as possible.

The kind of large-mode optical fiber, disclosed by the Chinese patent of invention CN1667439 (application no. 200410011158.5 and disclosure date of 09-14-2005), adopts the fiber structure of asymmetrical multi-coated ring fiber core that is composed of multi arcs, with specified radius of circular arc and concave arc, complex construction, and difficult realizing technology, also, the mode of this large-mode fiber is expanded, and the bending loss is relatively excessive, therefore the beam quality is relatively poor.

The US patent US2006/0103919A1 describes a high-level large mode field active optical Fiber that adopts channel construction to filter the high-level mode in the diffused large-mode through leakage channel, which does not only expands the mode but also improves the output beam quality, at the cost of optical power, with low efficiency of optical utilization and vulnerable fiber; in addition, the optical fiber core described in this patent has deeper refractive index depression, which is the critical defect leading to hollow laser beam, and consequently poor output laser beam quality.

In summary, the above-mentioned patents have not effectively solved the technical difficulty to improve transmission power while remaining excellent beam quality for large-mode AOF, and have not mentioned solution to the technical problem of high-power outer lower coating damage.

CONTENTS OF INVENTION

The technical problem to be solved by this invention is the poor quality of beam.

To solve the above-mentioned technical problem, the technological scheme adopted by this invention is provision of large mode field active optical fiber composed of fiber core, and internal silica glass coating, external silica glass coating and painting that in turn cover the external fiber core surface, the stated fiber core is produced by deposition and collapsar of rare earth ion doped silicon tetrachloride in silica glass tube, whose refractive index is graded index, variation range of fiber core RIP parameter $\alpha$ is $1 \leq \alpha \leq 3$, and the shape of internal silica glass coating is regular polygonal prism.

The shape of the internal silica glass coating stated in the above-mentioned scheme is regular hexagonal prism and regular octagonal prism.

The stated external silica glass coating is composed of fluorine-doped pure silica glass, and the relative refractive index difference formed by fluorine doping $\Delta\%$ is between $-0.1\% \sim -1.5\%$.

The rare earth ion in the stated fiber core is ytterbium ion or thulium ion, with content by molar percentage of $0.02\% \sim 0.36\%$.

The rare earth ion in the stated fiber core is compound of ytterbium ion and thulium ion, with content by molar percentage of $0.02\% \sim 0.36\%$, within which, the molar percentage of ytterbium ion and thulium ion is 1: 1~8.

This invention also provides the manufacturing method of a kind of large-mode AOF, including the following steps:

A10. Use PCVD technology to prepare silica glass bushing with inner wall of fluorine-doped layer, and the relative refractive index difference between this bushing and the pure silica glass is $-0.3\% \sim 1.5\%$;

A20. Use PCVD technology to deposit silicon tetrachloride and germanium tetrachloride on the inner wall of another hollow silica glass parent tube to prepare the prefab that is used for drawing the refractive index graded fiber core, and dope the rare earth ion in the mode of all gas-phase.

A30. Treat the hollow silica glass tube obtained in step A20 into solid prefab by collapsar at 2200° C.;

A40. Process the above-mentioned solid prefab into regular polygonal prism;

A50. Insert the regular polygonal prism into the silica glass bushing with inner wall of fluorine-doped layer obtained in step A10 to form large mode field active optical fiberpreform;

A60. Draw the above-mentioned large mode field active optical fiberpreform on wire drawing tower into large-mode AOF.

In the above-mentioned methods, the rare earth ion doped in step A20 is ytterbium ion or thulium ion, with content by molar percentage of $0.02\% \sim 0.36\%$.

The rare earth ion doped in step A20 is compound of ytterbium ion and thulium ion, with content by molar percentage of $0.5\% \sim 0.6\%$, within which the molar percentage of ytterbium ion and thulium ion is 10%~80%.

In step A20, the pressure in silica glass parent tube is 900pa~1600pa, the microwave power to heat the silica glass parent tube is 3.0kW~15.0kW, the deposition temperature is 1100~1300° C., the flow rate of silicon tetrachloride gas is 800ml/min~1600ml/min, the flow rate of germanium tetrachloride is controlled by the curve of $Q_1(r)=A_1+B_1 \times r+C_1 \times r^{\alpha 1}$, wherein, $A_1$=10.52~11.69, $B_1$=0.1326~0.16, $C_1$=-12.02~-11.32, $\alpha 1$=1.98~2.8. At the same time, the gas containing rare earth ion is inlet into the compound gas of silicon tetrachloride and germanium tetrachloride by molar percentage of 0.02%~0.36%, the fiber core RIP distributed parameter $\alpha$=1.92~2.86.

In step A30, when the center hole diameter of silica tube shrinks to 1.2~1.8 mm, inlet the $C_2F_6$ gas with density of 100%, which is corroded for 10~20 minutes, and then collaspared into solid silica glass core rod, with fiber core diameter of 3.2~4 mm and numerical fiber core aperture of 0.03~0.10, and the relative refractive index difference between the internal silica glass coating and fluorine-doped bushing with low refractive index is 0.2%~1.16%.

The large mode field active optical fiberprovided in this invention has both advantages of large-mode and output similar to single mode, improved the capacity of AOF to bear laser power and energy storage density, improved output laser bean quality, and avoided the technical problem of hollow output laser beam; the silica doubly coated structure improves the high-power transmission capacity and temperature resistant performance of AOF, and significantly improves the reliability of high-power optical fiber laser device; the adopted PCVD technology remarkably improves the efficiency of fluorine deposition, and reduces the silica glass refractive index below −1.0%, increases utilization rate of raw material, and reduces manufacturing cost.

DESCRIPTION OF ATTACHED FIGURES

SPECIFIC IMPLEMENTATION MODE

The following part is detailed specification of this invention combining with attached figures.

Figure 1:
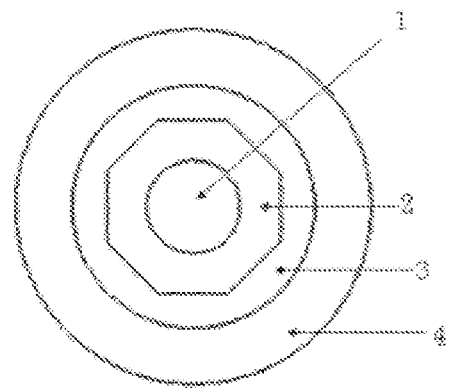
FIG. 1 is the Cross Sectional Schematic of Large mode field active optical fiberin this invention.
Figure 2:
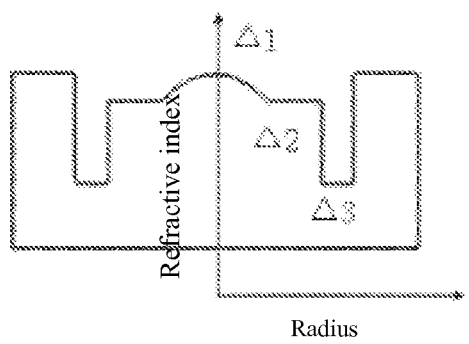
FIG. 2 is the Refractive Index Distribution Map on Large mode field active optical fiberCross Section in this invention

As shown in FIG. 1, the large mode field active optical fiber in this invention is composed of fiber core 1, and internal silica glass coating 2, external silica glass coating 3 and painting 4 that in turn cover the external surface of fiber core 1, manufactured by drawing technique. The painting 4 is protective layer, the same to the protective layer of existing optical fiber products. The fiber core 1 is manufactured by deposition and collapsar of rare earth ion doped silicon tetrachloride in silica glass tube, the above-mentioned rare earth ion is ytterbium ion, thulium ion or combination of the both, and the used compounds can be halide solution of rare earth ion, such as ytterbium chloride solution, thulium chloride solution, etc. The refractive index of fiber core 1 is graded index, and the variation range of fiber core RIP parameter $\alpha$ is $1 \leq \alpha \leq 3$. The shape of internal silica glass coating 2 is regular polygonal prism, such as regular hexagonal prism or regular octagonal prism, and the external silica glass coating is manufactured by fluorine deposition on the inner wall of silica glass tube, with relative refractive index difference against the internal coating 2 ($\Delta$%) between −0.1%~−1.5%. The rare earth ion in fiber core is ytterbium ion or thulium ion or compound of the both, with molar percentage content of 0.02%~0.36%, and in case the compound of ytterbium ion and thulium ion is adopted, the molar percentage of ytterbium ion and thulium ion in the compound is 1: 1~8. The FIG. 2 is Refractive Index Distribution Map On Large Mode Field Active Optical Fiber Cross Section in this invention This invention also provides the manufacturing method of the above-mentioned large-mode AOF, which is described in the following part by five implementation examples.

IMPLEMENTATION EXAMPLE I

This implementation example includes the following steps:

A10. Use PCVD technology to prepare fluorine-doped super pure silica glass bushing with low refractive index, and the relative refractive index difference between this bushing and the pure silica glass is −1.06%, i.e. fluorine is deposited on the inner wall of a hollow silica glass parent tube by PCVD technology, to obtain silica glass bushing with inner wall of fluorine-doped layer;

A20. Use PCVD technology to deposit silicon tetrachloride and germanium tetrachloride on the inner wall of another hollow silica glass parent tube to prepare the prefab that is used for drawing the fiber core. In this step, the pressure in silica glass parent tube is 1000pa~1200pa, the microwave power to heat the silica glass parent tube is 5.0 kW~7.0 kW, the deposition temperature is 1200~1250° C.; during the process of fiber core deposition, the flow rate of silicon tetrachloride gas is 1500ml/min~1600ml/min, the flow rate of germanium tetrachloride at different radial locations on core layer is controlled by the curve of $Q1(r)=A1+B1 \times r+C1 \times r^{\alpha 1}$, wherein, $A1=11.69$, $B1=0.1326$, $C1=-12.02$, $\alpha 1=2.0$, and r is time; at the same time, the ytterbium ion ($Yb^{3+}$) gas is inlet into the compound gas of silicon tetrachloride and germanium tetrachloride by molar percentage of 0.02%~0.36% in the mode of all gas-phase, A30. Put the ytterbium ion doped silica parent glass tube after deposition onto prefab collapsar lathe to process it into solid prefab, i.e. under the function of oxyhydrogen flame at high temperature of 2200° C.; the silica tube slowly shrinks, and when the center hold diameter of silica tube shrinks to 1.8 mm, inlet the $C_2F_6$ gas with density of 100%, which is corroded for 20 minutes, and then collapsared into solid silica glass core rod, with fiber core diameter of 4 mm and numerical aperture of 0.05; the fiber core RIP distributed parameter $\alpha=1.92$, and the relative refractive index difference between the internal silica glass coating and fluorine-doped bushing with low refractive index is 1.06%.

A40. Treat the above-mentioned solid prefab by precision machining, and grind it into internal coating in the shape of regular octagonal prism;

A50. Insert the above-mentioned regular polygonal prism into the fluorine-doped super pure silica glass bushing with low refractive index obtained in step A10 to form large mode field active optical fiber preform;

A60. Draw the above-mentioned large mode field active optical fiber preform on wire drawing tower, at high temperature of about 2200° C., into large-mode AOF, with fiber core diameter of 100 μm, circumcircle diameter of internal coating of 420 μm, and external coating diameter of 550 μm.

Figure 3:
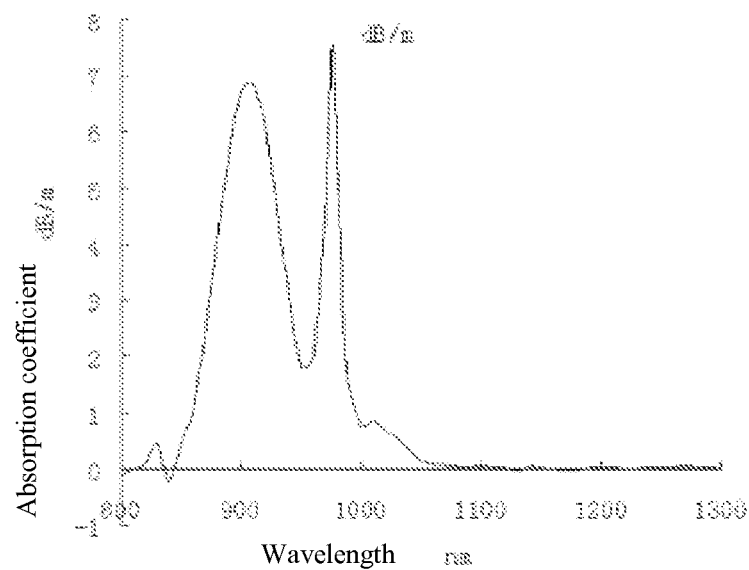
FIG. 3 is the Absorption Spectrogram of Large mode field active optical fibermanufactured by implementation example I.
Figure 4:
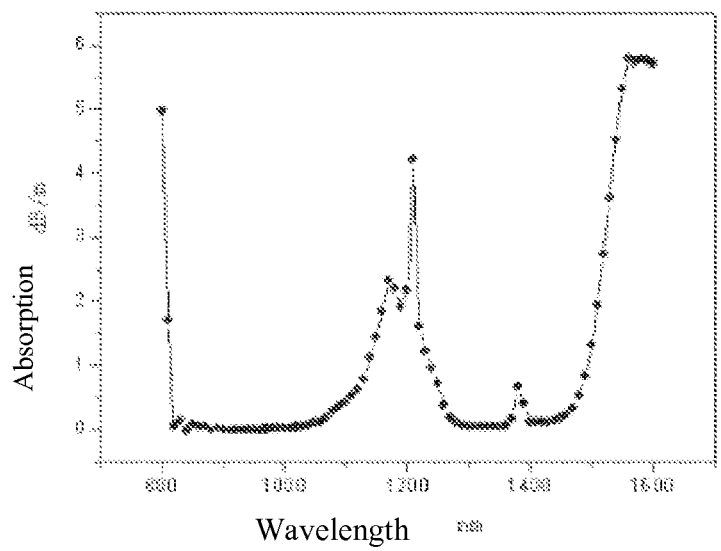
FIG. 4 is the Absorption Spectrogram of Large mode field active optical fibermanufactured by implementation example IV.

The absorption spectrogram of large mode field active optical fiber manufactured by this implementation example is shown in FIG. 3. After testing, the optical fiber's absorption coefficient is 6.82 dB/m at 915 nm wavelength, and 7.56 dB/m at 975 nm wavelength, the numerical aperture of optical fiber core is 0.05, and the numerical aperture of internal coating is 0.212.

IMPLEMENTATION EXAMPLE II

The differences between this implementation example and the implementation example I lie in:

In step A10, the relative refractive index difference between the bushing material and pure silica glass is −1.50%.

In step A20, the molar content of ytterbium ion ($Yb^{3+}$) is 0.12%, and the fiber core RIP distributed parameter $\alpha=2.03$.

In step A30, when the center hole diameter of silica tube shrinks to 1.2 mm, inlet the $C_2F_6$ gas with density of 100%, which is corroded for 10 minutes, and then collapsared into solid silica glass core rod, with fiber core diameter of 3 mm and numerical fiber core aperture of 0.05, and the relative refractive index difference between the internal silica glass coating and fluorine-doped bushing with low refractive index is 1.5%.

In step A60, the fiber core diameter of drawn large mode field active optical fiber is 110 μm, the internal coating diameter is 350 μm, and the external coating diameter is 450 μm.

The absorption spectrogram of large mode field active optical fiber manufactured by this implementation example is shown in FIG. 3. After testing, the optical fiber's absorption coefficient is 4.82 dB/m at 915 nm wavelength, and 5.21 dB/m at 975 nm wavelength, the numerical aperture of optical fiber core is 0.05, and the numerical aperture of internal coating is 0.25.

IMPLEMENTATION EXAMPLE III

The differences between this implementation example and the implementation example I lie in:

In step A10, the relative refractive index difference between the bushing material and pure silica glass is −0.30%.

In step A20, $A1=10.72$, $B1=0.15$, $C1=-11.68$, $\alpha_1=2.8$, molar content of ytterbium ion ($Yb^{3+}$) is 0.15%, and fiber core RIP distributed parameter $\alpha=2.86$.

In step A30, when the center hole diameter of silica tube shrinks to 1.6 mm, inlet the $C_2F_6$ gas with density of 100%, which is corroded for 15 minutes, and then collapsared into solid silica glass core rod, with fiber core diameter of 3.2 mm and numerical fiber core aperture of 0.06.

In step A40, the solid prefab is grinded into internal coating in the shape of regular hexagonal prism.

In step A60, the fiber core diameter of drawn large mode field active optical fiber is 202 μm, the internal coating diameter is 655 μm, and the external coating diameter is 756 μm.

The absorption spectrogram of large mode field active optical fiber manufactured by this implementation example is shown in FIG. 3. After testing, the optical fiber's absorption coefficient is 4.96 dB/m at 915 nm wavelength, and 5.32 dB/m at 975 nm wavelength, the numerical aperture of optical fiber core is 0.06, and the numerical aperture of internal coating is 0.11.

IMPLEMENTATION EXAMPLE IV

The differences between this implementation example and the implementation example I lie in:

In step A10, the relative refractive index difference between the bushing material and pure silica glass is −1.30%.

In step A20, A1=10.52, B1=0.76, C1=−11.32, $\alpha_1$=1.98, molar content of thulium ion ($Tm^{3+}$) is 0.18%, and fiber core RIP distributed parameter $\alpha$=2.02.

In step A30, when the center hole diameter of silica tube shrinks to 1.68 mm, inlet the C2F6 gas with density of 100%, which is corroded for 15 minutes, and then collaspared into solid silica glass core rod, with fiber core diameter of 3.6 mm, numerical fiber core aperture of 0.06, and the relative refractive index difference between internal silica glass coating and fluorine-doped bushing with low refractive index is 1.3%.

In step A60, the fiber core diameter of drawn large mode field active optical fiber is 116 μm, the internal coating diameter is 358 μm, and the external coating diameter is 450 μm. After testing, the absorption spectrogram of this optical fiber is shown in FIG. 3.

As to the large mode field active optical fiber manufactured by this implementation example, its absorption coefficient is 4.96 dB/m at 795 nm wavelength, 2.16 dB/m at 1180 nm wavelength, and 4.06 dB/m at 1210 nm wavelength, the numerical aperture of optical fiber core is 0.06, and the numerical aperture of internal coating is 0.235.

IMPLEMENTATION EXAMPLE V

The differences between this implementation example and the implementation example I lie in:

In step A10, the relative refractive index difference between the bushing material and pure silica glass is −1.20%.

In step A20, A1=10.52, B1=0.16, C1=−11.32, $\alpha_1$=2.98, molar content of ytterbium ion ($Yb^{3+}$) is 0.06%, molar content of thulium ion ($Tm^{3+}$) is 0.12%, and fiber core RIP distributed parameter $\alpha$=2.0.

In step A30, when the center hole diameter of silica tube shrinks to 2.0mm, inlet the $C_2F_6$ gas with density of 100%, which is corroded for 10 minutes, and then collaspared into solid silica glass core rod, with fiber core diameter of 4.2 mm, numerical fiber core aperture of 0.06, and the relative refractive index difference between internal silica glass coating and fluorine-doped bushing with low refractive index is 1.20%.

In step A60, the fiber core diameter of drawn large mode field active optical fiber is 120 μm, the internal coating diameter is 350 μm, and the external coating diameter is 450 μm.

As to the large mode field active optical fiber manufactured by this implementation example, its absorption coefficient is 3.16 dB/m at 795 nm wavelength, 2.06 dB/m at 915 nm wavelength, the numerical aperture of optical fiber core is 0.06, and the numerical aperture of internal coating is 0.215. This implementation example only provides one molar content of ytterbium ion ($Yb^{3+}$) and thulium ion ($Tm^{3+}$), actually, the compound ratio between the two can be 1:1~8, for example: 0.12% ytterbium ion ($Yb^{3+}$) and 0.12% thulium ion ($Tm^{3+}$); 0.03% ytterbium ion ($Yb^{3+}$) and 0.24% thulium ion ($Tm^{3+}$); or 0.05% ytterbium ion ($Yb^{3+}$) and 0.20% thulium ion ($Tm^{3+}$).

This invention should not be limited within the above-mentioned optical implementation modes, any one should notice the structural variations made by inspiration of this invention, and any technological scheme that is the same or similar to this invention should be included in the protective scope of this invention.

We claim:

1. A large mode field active optical fiber composed of a fiber core, and an internal silica glass coating, an external silica glass coating and a painting that cover the external surface of the fiber core, wherein the stated fiber core is produced by deposition and collapse of rare earth ion doped silicon tetrachloride in a silica glass tube, having a graded refractive index, wherein a variation range of fiber core RIP parameter á is 1≤á ≤3 and wherein the shape of internal silica glass coating is a regular polygonal prism.

2. The large mode field active optical fiber of claim 1, wherein the regular polygonal prism is a regular hexagonal prism or an octagonal prism.

3. The large mode field active optical fiber in of claim 1 or claim 2, wherein the stated external silica glass coating is composed of fluorine-doped pure silica glass, and the relative refractive index difference formed by fluorine doping Ä % is between −0.1%~−1.5%.

4. The large mode field active optical fiber of claim 3, wherein the rare earth ion in the stated fiber core is ytterbium ion or thulium ion, having a molar percentage content of 0.02%~0.36%.

5. The large mode field active optical fiber of claim 3, wherein the rare earth ion in the stated fiber core is a compound of ytterbium ion and thulium ion with a molar percentage content of 0.02%~0.36%, within which, the molar ratio of ytterbium ion and thulium ion is 1: 1~8.

6. A manufacturing method of a large mode active optical fiber (AOF), including the following steps:
   A10. Using PCVD technology to prepare a fluorine-doped silica glass bushing with inner wall formed by a fluorine-doped layer, wherein the relative refractive index difference between the bushing and pure silica glass is −0.3%~−1.5%;
   A20. Using PCVD technology to deposit silicon tetrachloride and germanium tetrachloride on the inner wall of a hollow silica glass parent tube to prepare a prefab that is used for drawing a refractive index graded fiber core, and doping a rare earth ion in an all gas-phase;
   A30. Collapsing a hollow silica glass tube obtained in step A20 into a solid prefab at 2200° C.;
   A40. Processing the solid prefab into a regular polygonal prism to form an internal silica glass coating;
   A50. Inserting the regular polygonal prism into the silica glass bushing with an inner wall formed by the fluorine-doped layer obtained in step A10 to form a large mode field active optical fiber preform; and
   A60. Drawing the large mode field active optical fiber preform on a wire drawing tower into a large-mode AOF.

7. The manufacturing method of a large mode field active optical fiber of in claim 6, wherein the rare earth ion doped in step A20 is ytterbium ion or thulium ion with a molar percentage content of 0.02%~0.36%.

8. The manufacturing method of a large mode field active optical fiber of claim 6, wherein the rare earth ion doped in step A20 is a compound of ytterbium ion and thulium ion with a molar percentage content of 0.5%~0.6%, within which the molar percentage of ytterbium ion and thulium ion is 10%~80%.

9. The manufacturing method of large mode field active optical fiber of claim 6, claim 7 or claim 8, wherein in step A20 the pressure in the hollow silica glass parent tube is 900 Pa~1600 Pa, the microwave power to heat the hollow silica glass parent tube is 3.0 kW~15.0 kW, the deposition temperature is 1100° C.~1300° C., the flow rate of silicon tetrachloride gas is 800 ml/min~1600 ml/min, the flow rate of germanium tetrachloride is controlled by the curve of $Q_1(r)=A_1+$ $B_1 \times r + C_1 \times r^{á1}$, wherein $A_1=10.52~11.69$, $B_1=0.1326~0.16$, $C_1=-12.02~-11.32$, $á1=1.98~2.8$, wherein, the gas containing rare earth ion is simultaneously inlet into the compound gas of silicon tetrachloride and germanium tetrachloride by molar percentage of 0.02%~0.36%, the fiber core RIP distributed parameter =1.92~2.86.

10. The manufacturing method of a large mode field active optical fiber of claim 9, wherein in step A30 $C_2F_6$ gas with a density of 100% is inlet when the center hole diameter of the silica glass parent tube shrinks to 1.2 mm 1.8 mm, the tube is corroded for 10 minutes~20 minutes, and then collapsed into a solid silica glass core rod, having a fiber core diameter of 3.2 mm 4 mm and a numerical fiber core aperture of 0.03~0.10, and the relative refractive index difference between the internal silica glass coating and the fluorine-doped bushing with low refractive index is 0.2%~1.16%.

* * * * *